US012143463B2

(12) United States Patent
Sung et al.

(10) Patent No.: US 12,143,463 B2
(45) Date of Patent: Nov. 12, 2024

(54) METHOD AND APPARATUS FOR GUARANTEEING QUALITY OF SERVICE BETWEEN A PUBLIC NETWORK AND A NON- PUBLIC NETWORK

(71) Applicant: ELECTRONICS AND TELECOMMUNICATIONS RESEARCH INSTITUTE, Daejeon (KR)

(72) Inventors: Jihoon Sung, Daejeon (KR); Soohwan Lee, Daejeon (KR); Myung Ki Shin, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/714,018

(22) Filed: Apr. 5, 2022

(65) Prior Publication Data

US 2022/0321674 A1    Oct. 6, 2022

(30) Foreign Application Priority Data

| Apr. 5, 2021 | (KR) | 10-2021-0044263 |
| Apr. 5, 2021 | (KR) | 10-2021-0044264 |
| Apr. 5, 2021 | (KR) | 10-2021-0044265 |
| May 10, 2021 | (KR) | 10-2021-0060164 |
| Aug. 10, 2021 | (KR) | 10-2021-0105627 |
| Dec. 3, 2021 | (KR) | 10-2021-0172375 |

(Continued)

(51) Int. Cl.
*H04L 67/61* (2022.01)
*H04L 41/5003* (2022.01)
*H04L 67/52* (2022.01)

(52) U.S. Cl.
CPC .......... *H04L 67/61* (2022.05); *H04L 41/5003* (2013.01); *H04L 67/52* (2022.05)

(58) Field of Classification Search
CPC ...... H04L 67/61; H04L 67/52; H04L 41/5003
(Continued)

(56) References Cited

U.S. PATENT DOCUMENTS 9,935,962 B2    4/2018  Burns et al.
2008/0259794 A1  10/2008  Zou et al.
(Continued)

FOREIGN PATENT DOCUMENTS

| KR | 1020180103892 A | 9/2018 |
| KR | 1020210029648 A | 3/2021 |
| KR | 1020210096278 A | 8/2021 |

OTHER PUBLICATIONS

S2-2102252, Change Request for "Enabling restricted PDU Session for remote provisioning of UE via User Plane", SA WG2 Meeting #144e, Apr. 12-Apr. 16, 2021.
(Continued)

*Primary Examiner* — Adnan M Mirza
(74) *Attorney, Agent, or Firm* — Rabin & Berdo, P.C.

(57) ABSTRACT

An application function (AF) in a first network and a method for providing a service by the AF via a second network including: requesting quality of service (QoS) related information to a network exposure function (NEF) of a second network different from the first network in which the AF is located, wherein the QoS related information is used to guarantee the QoS of a service to be provided to a terminal; and receiving the QoS related information from the NEF of the second network are provided.

13 Claims, 12 Drawing Sheets

(30) Foreign Application Priority Data

| Apr. 5, 2022 | (KR) | ......................... 10-2022-0042457 |
| Apr. 5, 2022 | (KR) | ......................... 10-2022-0042458 |
| Apr. 5, 2022 | (KR) | ......................... 10-2022-0042459 |

(58) Field of Classification Search

USPC ........................................................ 709/223
See application file for complete search history.

(56) References Cited

U.S. PATENT DOCUMENTS

| 2015/0146706 | A1 | 5/2015 | Goluboff |
| 2015/0288656 | A1 | 10/2015 | Yoon et al. |
| 2016/0308836 | A1 | 10/2016 | Park et al. |
| 2016/0308904 | A1 | 10/2016 | Yoon et al. |
| 2018/0217860 | A1 | 8/2018 | Kim et al. |
| 2018/0288590 | A1 | 10/2018 | Bhalla |
| 2021/0144593 | A1 | 5/2021 | Ahn |
| 2021/0306275 | A1 | 9/2021 | Ke |
| 2022/0086257 | A1* | 3/2022 | Fu ............................ H04L 43/14 |
| 2022/0263724 | A1* | 8/2022 | Lair ......................... H04L 43/04 |
| 2023/0199632 | A1* | 6/2023 | Talebi .................... H04W 48/16 |
| | | | 455/434 |

OTHER PUBLICATIONS

S2-2104024, Change Request for "Informative guideline on using existing mechanism for QoS Notification between SNPN and PLMN when using N3IWF", SA WG2 Meeting #143e, Feb. 24-Mar. 9, 2021.

S2-2105608, Change Request for "Informative guidelines for usage of QoS related exposure capabilities to leverage between underlay network and overlay network", 3GPP TSG-SA WG2 Meeting #146E, Aug. 16-Aug. 27, 2021.

3GPP, TS23.502 v16.0.0, 3rd Generation Partnership Project; Technical Specification Group Services and System Aspects; Procedures for the 5G System; Stage 2, 3GPP (Mar. 27, 2019).

Futurewei, S2-2100368r12, Informative guidline on using existing mechanism for Qos Notification between SNPN and PLMN when using N3IWF, 3GPP TSG SA WG2#143E, 3GPP (Mar. 5, 2021).

\* cited by examiner

METHOD AND APPARATUS FOR GUARANTEEING QUALITY OF SERVICE BETWEEN A PUBLIC NETWORK AND A NON- PUBLIC NETWORK

CROSS-REFERENCE TO RELATED APPLICATION

This application claims priority to and the benefit of Korean Patent Application No. 10-2021-0044263 filed in the Korean Intellectual Property Office on Apr. 5, 2021, Korean Patent Application No. 10-2021-0044264 filed in the Korean Intellectual Property Office on Apr. 5, 2021, Korean Patent Application No. 10-2021-0044265 filed in the Korean Intellectual Property Office on Apr. 5, 2021, Korean Patent Application No. 10-2021-0060164 filed in the Korean Intellectual Property Office on May 10, 2021, Korean Patent Application No. 10-2021-0105627 filed in the Korean Intellectual Property Office on Aug. 10, 2021, Korean Patent Application No. 10-2021-0172375 filed in the Korean Intellectual Property Office on Dec. 3, 2021, Korean Patent Application No. 10-2022-0042457 filed in the Korean Intellectual Property Office on Apr. 5, 2022, Korean Patent Application No. 10-2022-0042458 filed in the Korean Intellectual Property Office on Apr. 5, 2022, and Korean Patent Application No. 10-2022-0042459 filed in the Korean Intellectual Property Office on Apr. 5, 2022, the entire contents of which are incorporated herein by reference.

BACKGROUND OF THE INVENTION

(a) Field of the Invention

This disclosure relates to a method and apparatus for guaranteeing end-to-end quality of service between a public network and a non-public network.

(b) Description of the Related Art

It is needed to guarantee a Quality of Service (QoS) over a certain level to a terminal in a non-public network (NPN) and a public network. To this end, it is necessary to establish an agreement for the level of the QoS required in each section of the non-public network and the public network and QoS indicators.

The above information disclosed in this Background section is only for enhancement of understanding of the background of the invention, and therefore it may contain information that does not form the prior art that is already known in this country to a person of ordinary skill in the art.

SUMMARY OF THE INVENTION

Embodiments of the invention provide an application function (AF) in a first network.

Embodiments of the invention provide a method for providing a service to a terminal by an application function (AF) in a first network via a second network.

Embodiments of the invention provide a network exposure function (NEF) in a first network.

An embodiment of the invention provides an application function (AF) in a first network. The AF includes a processor, a memory, and a communication device, wherein the processor executes a program stored in the memory to perform: requesting quality of service (QoS) related information to a network exposure function (NEF) of a second network different from the first network in which the AF is located, wherein the QoS related information is used to guarantee the QoS of a service to be provided to a terminal; and receiving the QoS related information from the NEF of the second network.

In an embodiment, when the processor performs the requesting of the QoS related information, the processor may perform: requesting the QoS related information by invoking a service operation for a network exposure service to the NEF, wherein the QoS related information includes QoS sustainabilities provided by a network data analytics function (NWDAF) in the second network.

In an embodiment, when the processor performs the requesting the QoS related information by invoking a service operation for a network exposure service to the NEF, the processor may perform inputting location information of the terminal and QoS requirements when invoking the service operation.

In an embodiment, when the processor performs the inputting location information of the terminal and QoS requirements when invoking the service operation, the processor may perform obtaining the location information of the terminal from the second network based on a service level agreement (SLA) between the first network and the second network.

In an embodiment, when the processor performs the inputting location information of the terminal and QoS requirements when invoking the service operation, the processor may perform obtaining the location information of the terminal from a gateway mobile location center (GMLC) or a location management function (LMF) of the second network.

In an embodiment, when the processor performs the inputting location information of the terminal and QoS requirements when invoking the service operation, the processor may perform obtaining the location information of the terminal by invoking a service operation for a location-related service for the terminal to the NEF of the second network.

In an embodiment, when the processor performs the inputting location information of the terminal and QoS requirements when invoking the service operation, the processor may perform obtaining the location information of the terminal from the terminal through an application layer.

In an embodiment, when the processor performs the inputting location information of the terminal and QoS requirements when invoking the service operation, the processor may perform inputting a 5G QoS Identifier (5QI) for a QoS to be required by the AF as the QoS requirements subject to a service level agreement (SLA) between the first network and the second network.

In an embodiment, when the processor performs the inputting location information of the terminal and QoS requirements when invoking the service operation, the processor may perform inputting a QoS characteristics for a QoS to be required by the AF as the QoS requirements when there is a service level agreement (SLA) between the first network and the second network.

In an embodiment, when the processor performs the requesting of the QoS related information, the processor may perform requesting the QoS related information by sending a message requesting QoS information related to a session of the AF to the NEF, wherein the QoS related information includes QoS monitoring information received from a session management function (SMF) or user plane function (UPF) in the second network.

In an embodiment, the first network is connected to the terminal with 3GPP access, the second network is connected to the terminal with non-3GPP access, and the AF provides the service to the terminal via the second network.

An embodiment of the invention provides a method for providing a service to a terminal by an application function (AF) in a first network via a second network. The method includes: requesting quality of service (QoS) related information to a network exposure function (NEF) of the first network, wherein the QoS related information is used to guarantee the QoS of the service; and receiving the QoS related information from the NEF of the second network, wherein the first network is connected to the terminal with non-3GPP access and the second network is connected to the terminal with 3GPP access.

In an embodiment, the requesting of the QoS related information may include requesting the QoS related information by invoking a service operation for a network exposure service to the NEF. wherein the QoS related information includes QoS sustainabilities provided by a network data analytics function (NWDAF) in the second network.

In an embodiment, the requesting the QoS related information by invoking a service operation for a network exposure service to the NEF may include inputting location information of the terminal and QoS requirements when invoking the service operation.

In an embodiment, the inputting location information of the terminal and QoS requirements when invoking the service operation may include obtaining the location information of the terminal from the second network based on a service level agreement (SLA) between the first network and the second network.

In an embodiment, the inputting location information of the terminal and QoS requirements when invoking the service operation may include obtaining the location information of the terminal from a gateway mobile location center (GMLC) or a location management function (LMF) of the first network.

In an embodiment, the inputting location information of the terminal and QoS requirements when invoking the service operation may include obtaining the location information of the terminal by invoking a service operation for a location-related service for the terminal to the NEF of the second network.

An embodiment of the invention provides a network exposure function (NEF) in a first network. The NEF includes a processor, a memory, and a communication device, wherein the processor executes a program stored in the memory to perform: receiving a request for quality of service (QoS) related information from an application function (AF) in a second network different from the first network, wherein the QoS related information is used to guarantee the QoS of a service to be provided to the terminal; and transmitting the QoS related information to the AF in the second network.

An embodiment of the invention provides a network function (NF) in an onboarding network. The NF includes a processor, a memory, and a communication device, wherein the processor executes a program stored in the memory to perform: receiving a provisioning server address (PVS address) from an external domain; storing the PVS address; and transmitting the PVS address to a terminal according to a result of authentication of the terminal when the terminal request a registration to the onboarding network.

An embodiment of the invention provides a network function (NF) in an onboarding network. The NF includes a processor, a memory, and a communication device, wherein the processor executes a program stored in the memory to perform: request authentication-related information of a terminal from an application function (AF) in an external domain to determine whether the terminal is authorized to access a provisioning server when receiving a registration request for the onboarding network from the terminal; and receiving a response including the authentication-related information from the AF.

DETAILED DESCRIPTION OF THE EMBODIMENTS

Figure 1:
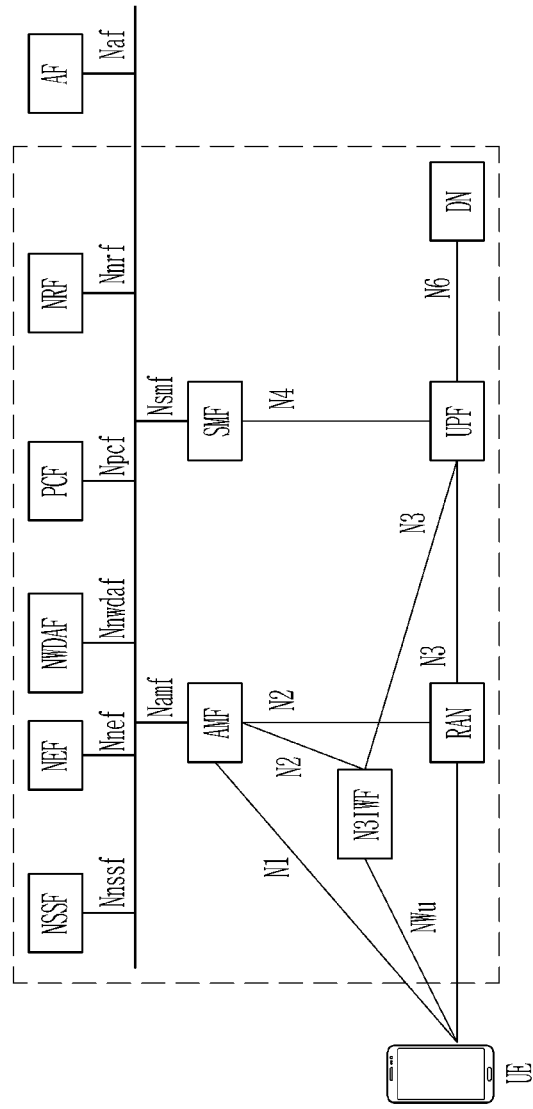
FIG. 1 is a schematic diagram illustrating topology of a mobile communication system according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, a terminal may be called user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a schematic diagram illustrating topology of a mobile communication system according to an embodiment.

Referring to FIG. 1, a core network of a mobile communication system according to an embodiment includes a plurality of network functions (NFs) and may connect a data network (DN) and a UE.

An (radio) access network ((R)AN) may represent a base station providing 3GPP access and/or a base station or AP (access point) providing non-3GPP access such as Wi-Fi. The (R)AN may be connected to an access and mobility management function (AMF) through an N2 interface and may be connected to a user plane function (UPF) through an N3 interface.

The AMF may be responsible for a mobility management function for the UE. The AMF may provide an access and mobility management function to the access technology independently, that is, to a unit of a terminal or the UE. Therefore, each terminal may be basically connected to one AMF.

A session management function (SMF) may perform a function for managing a session up to the UE. When multiple sessions are maintained for the terminal, different SMFs may be assigned for each session.

A policy control function (PCF) may determine policies such as session management and mobility management based on packet flow information received from an application function (AF) to guarantee QoS (Quality of Service). The policy determined by the PCF may be transmitted to the AMFs, the SMFs, and the like, and then, functions such as the mobility management, the session management, the QoS management may be performed in each NF.

The DN may transfer a protocol data unit (PDU) to be transmitted to the terminal to the UPF or may receive a PDU transmitted from the terminal through the UPF. The UPF and the DN may be connected through an N6 interface.

The UPF may be configured using control signal information generated by the SMF and the UPF may report its status to the SMF through an N4 interface.

The terminal and the AMF may be connected through an N1 interface.

The authentication server function (AUSF) may store data for authentication of the terminal.

By collecting and analyzing various network data, the NWDAF may help optimization of operations of the network functions in the core network, such as the AMF, the SMF, and the PCF. The NWDAF may provide various analysis information and/or analytics required for optimizing the operations of the network functions by analyzing data, events, and state information from various network functions in the core network. Therefore, each network function may optimize its operation by utilizing various analysis information and/or analytics provided by the NWDAF.

A network repository function (NRF) is an entity in the core network that may store information such as profiles of network functions (e.g. NF capacity, load, address, name of supported services). The information stored in the NRF may be provided by invoking service operations such as NFDiscovery_Request and NFManagement_NFStatusNotify.

A network exposure function (NEF) is an entity that may safely expose services and capabilities provided by the 3GPP network functions to a third-party server outside the 3GPP network.

In an embodiment, based on analytics information from the NWDAF, a notification of QoS information may be continuously provided between an NPN and a PLMN or two or more NPNs, so that end-to-end QoS over a certain level required for service of an overlay network may be guaranteed to terminals connected to an underlay network.

For example, when a terminal accesses the overlay network via the underlay network, a method according to an embodiment may provide procedures to be guaranteed, by the underlay network for the QoS required by the service provided from the overlay network. In an embodiment, the underlay network may be a network to which a terminal is currently connected and the overlay network may be a network that may provide a service desired by the terminal. A terminal may connect to the overlay network via the underlay network which is the currently connected to the terminal. In an embodiment, QoS parameter mapping based on a service level agreement (SLA) between two networks may be used. In another embodiment, information exchange may occur between the heterogeneous networks (or between networks) via a network exposure function (NEF).

When a terminal accesses the overlay network via the underlay network, in order to ensure the underlay network to support the QoS required by the overlay network, a QoS differentiation mechanism based on network-initiated QoS modification may be used. In an embodiment, following considerations may be possible in the QoS differentiation mechanism.

The overlay network service may have specific QoS requirements that need to be fulfilled by the underlay network based on the SLA between the overlay network and the underlay network.

The SLA may selectively cover the service of the overlay network which requires QoS support in the underlay network. The rest of the overlay network traffic may be handled by the underlay network in a best efforts basis.

The SLA between the overlay network and the underlay network may include a mapping between the differentiated service code point (DSCP) value of the IPsec child SAs (internet protocol security child security associations) and the QoS requirements of the overlay network service. The QoS requirements may include QoS parameters that are necessary (e.g., QoS parameters of 5G NR specifications such as 5Q1, ARP, etc.) during the network-initiated QoS modification in the underlay network.

SLA may include an association between terminal identifiers of the underlay network (e.g., Generic Public Subscription Identifier (GPSI)), an IP address of the N3IWF in the overlay network, and the DSCP values of the IPsec child SAs for the selective services of the overlay network.

The mapping agreed in the SLA may be configured at the N3IWF in the overlay network and the SMF/PCF in the underlay network.

When the terminal establishes a PDU session in the underlay network, the PCF in the underlay network may install policy and charging control (PCC) rules on the SMF. Here, the SMF may be a control plane function that generates and installs rules such as a packet detection rule (PDR)/usage reporting rule (URR) on the UPF. The PCC rule may indicate the DSCP value of the IPsec child SAs of the overlay network which require QoS support by the underlay network. The PCF may be configured based on the agreed mapping in the SLA, as described above. Accordingly, the UPF in the underlay network may detect packets of the IPsec child SAs corresponding to services of the overlay network which require the QoS support by the underlay network.

A terminal may register and establish a PDU session in the overlay network via predetermined user plane connectivity in the underlay network. When the terminal accesses a specific service of the overlay network, a QoS flow in the overlay network may be created, and then the N3IWF may create a dedicated IPsec child SA for each QoS flow of the overlay network that requires the QoS support of the underlay network.

The N3IWF may use a QoS profile and session-aggregated maximum bit ratio (AMBR) received from the SMF in the overlay network along with the mapping table in the SLA to derive a specific DSCP value for the IPsec child SA. The terminal may accordingly set DSCP marking in the outer IP header in the uplink and the N3IWF may set DSCP marking in the outer IP header in the downlink accordingly.

The overlay network traffic between the terminal and the N3IWF using the specific DSCP marking may be detected by the UPF in the underlay network, based on previously installed PDR/URR. The detection of the overlay network traffic may also be informed to the SMF and PCF within the underlay network. The PCF of the underlay network may install a new PCC rule including a QoS parameter for handling packets corresponding to the specific IPsec child SA on the SMF. The SMF of the underlay network may generate a QoS profile that triggers a PDU session modification procedure. The QoS parameters may be derived from the SLA mapping table based on the detected DSCP value.

Figure 2:
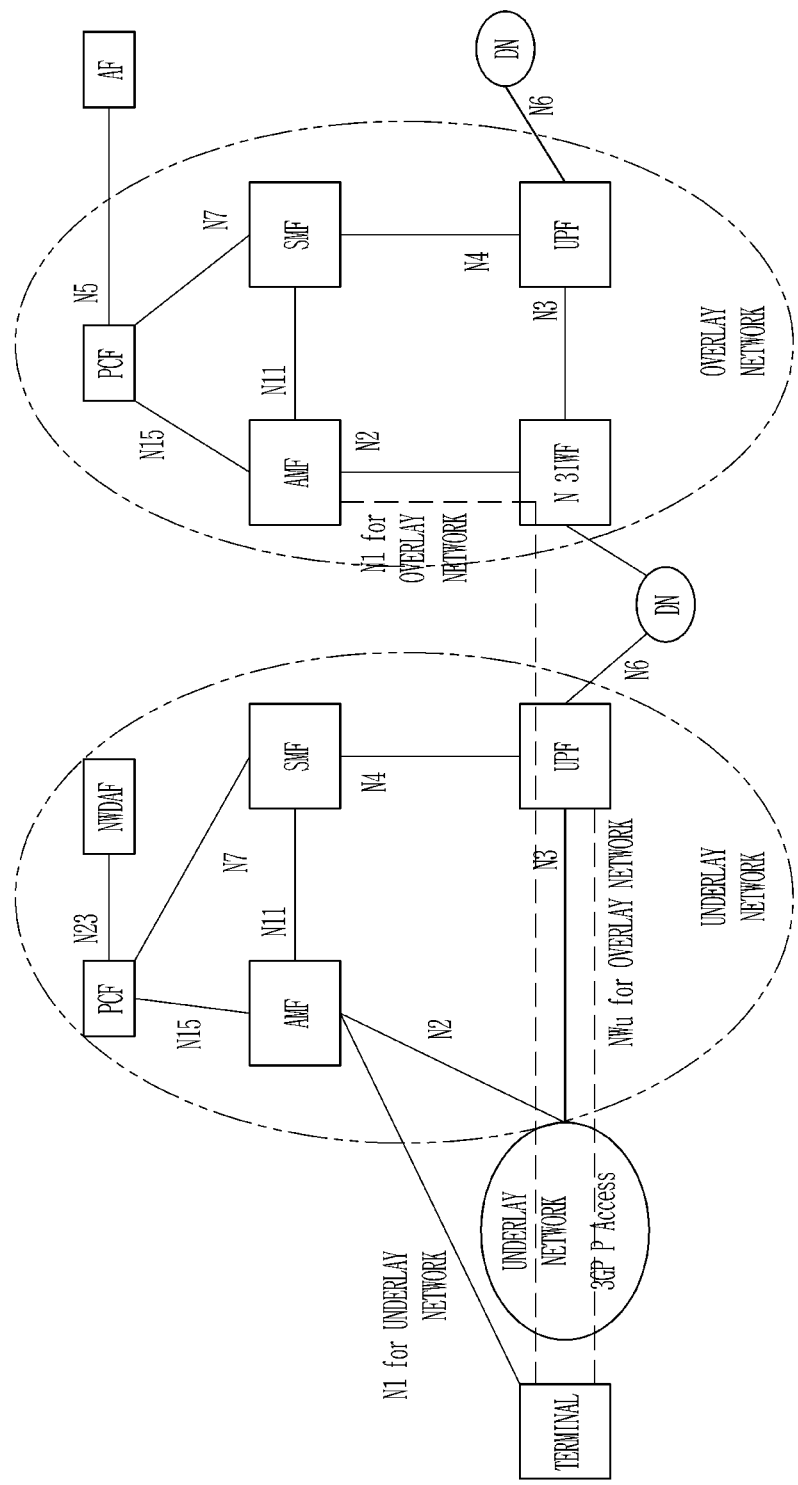
FIG. 2 is a schematic diagram illustrating a method for acessing a service of the overlay network via the underlay network by a terminal according to an embodiment.
Figure 3:
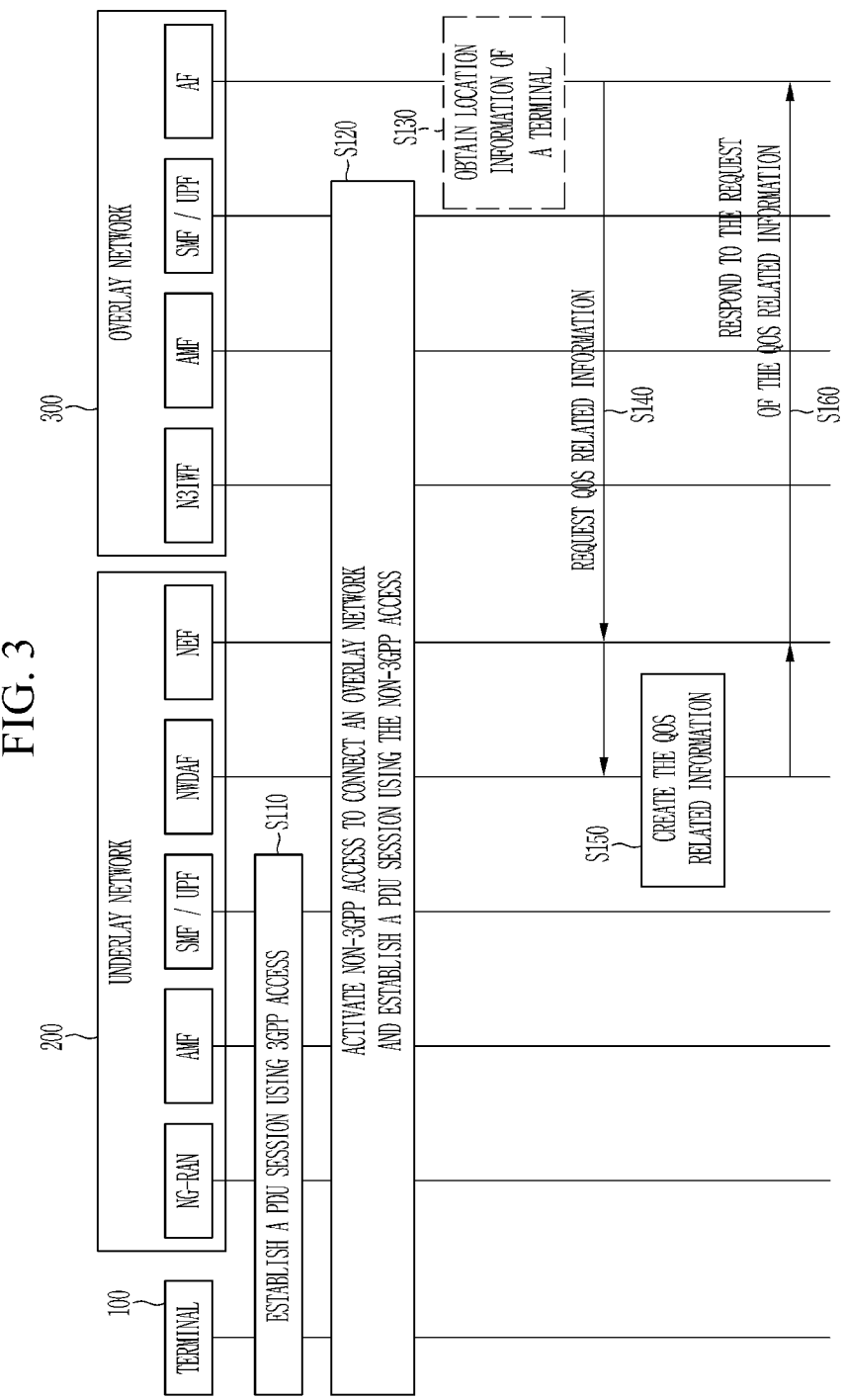
FIG. 3 is a flowchart illustrating a method for accessing a service of the overlay network via the underlay network by the terminal according to an embodiment.

FIG. 2 is a schematic diagram illustrating a method for acessing a service of the overlay network via the underlay network by a terminal according to an embodiment and FIG. 3 is a flowchart illustrating a method for accessing a service of the overlay network via the underlay network by the terminal according to an embodiment.

When the terminal is camping on the access network of the underlay network, the terminal may obtain access to the service of the overlay network. The terminal may establish a PDU session with the underlay network using the 3GPP access and may establish another PDU session through the N3IWF of the overlay network using the non-3GPP access. In an embodiment, the non-3GPP access may be an expression to represent an establishment of logical access toward an interworking function in the core network (e.g., a non-3GPP interworking function (N3IWF)).

In an embodiment, the underlay network may be a non-public network (e.g., a stand-alone non-public network (SNPN)) and the overlay network may be a public land mobile network (PLMN). Alternatively, the underlay network may be the PLMN and the overlay network may be the non-public network such as the SNPN. Alternatively, both the underlay network and the overlay network may be the non-public networks such as the SNPN. The underlay network and the overlay network may be different networks.

Referring to FIG. 2, 'N1 for Underlay network' may indicate a reference point between the terminal and the AMF in the underlay network. 'Nwu for Overlay network' may indicate a reference point between the terminal and the N3IWF in the overlay network for establishing a secure tunnel between the terminal and the N3IWF through the underlay network. 'N1 for Overlay network' may indicate a reference point between the terminal and the AMF of the overlay network. The underlay network may be the SNPN when the overlay network is the PLMN. Also, the underlay network may be the PLMN when the overlay network is the SNPN. Alternatively, both the underlay network and the overlay network may be the SNPNs.

In an embodiment, when the N3IWF-based solution is used to deliver a vertical service between the underlay network and the overlay network, the overlay network and an AF in the overlay network may subscribe and receive notifications from the underlay network by using the NEF through an interface between the NEF and the AF, such as subscribing to 'monitoring events' or 'QoS sustainability'. In an embodiment, the notification that the overlay network receives from the underlay network may relate to a connectivity status related to IPsec of the overlay network or QoS analytics information. According to QoS update information from the underlay network, the overlay network may adjust QoS regarding the connectivity of the overlay network.

In the embodiment, according to an agreement between the overlay network and the underlay network, the AF in the overlay network may act as an authorized 3rd party interacting with the NEF in the underlay network to use network exposure capabilities (or network exposure service) capable of receiving the connectivity and the QoS analytics information of the underlay network. Subscription to the underlay network may include subscription and reception of monitoring events (e.g., loss of connectivity, PDU session status), subscription and reception of QoS analytics information (e.g., QoS sustainability).

Referring to FIG. 3, the terminal 100 according to an embodiment may establish a PDU session with the underlay network 200 using the 3GPP access (S110). Thereafter, the terminal 100 may activate the non-3GPP access for connecting with the overlay network 300 and may establish another PDU session with the overlay network 300 using the non-3GPP access (S120).

The terminal 100 that has activated the non-3GPP access may register information of the terminal 100 to the overlay network 300 through the non-3GPP interworking function (N3IWF) of the overlay network 300 using the non-3GPP access. In an embodiment, the terminal 100 may transmit at least one of subscription information of the terminal 100, location information of the terminal 100 to the overlay network 300.

When the terminal 100 performs the registration procedure for the overlay network 300 and/or establishes the PDU session with the overlay network 300 using the non-3GPP access, the NF or AF of the overlay network 300 may request from the underlay network 200 QoS related information required to guarantee QoS for a service from the overlay network to be provided to the terminal (S140). In an embodiment, the AF or NF of the overlay network 300 may input QoS requirements and the location information of the terminal to a service operation for the underlay network 200 to request the QoS related information.

QoS requirements may include at least one of 5QI (5G QoS identifier) and QoS characteristic.

The AF or NF of the overlay network 300 may provide the 5QI to the underlay network 200 as the QoS requirements subject to an SLA agreed between the overlay network 300 and the underlay network 200. When the 5QI is received from the overlay network 300, the NEF of the underlay network 200 may determine QoS information of the underlay network 200 mapped with the 5QI of the overlay network 300 according to the SLA.

Alternatively, subject to the SLA agreed between the overlay network 300 and the underlay network 200, the AF or NF of the overlay network 300 may provide the QoS characteristic to the underlay network 200 as the QoS requirements. When the QoS characteristic is received from the overlay network 300, the NEF of the underlay network 200 may determine a QoS requirement that is the most similar to the QoS characteristic of the overlay network 300 based on the SLA.

The AF or NF of the overlay network 300 may obtain the location information of the terminal through the SLA-based method, invocation of a service operation, etc., or directly obtain the location information of the terminal from the terminal through an application layer (S150). Alternatively, the AF or NF of the overlay network 300 may use the location information of the terminal transmitted from the terminal when the terminal registers with the overlay network 300 through the non-3GPP access.

The AF or NF of the overlay network 300 may obtain the location information of the terminal from the underlay network 200 based on the SLA agreed between the overlay network 300 and the underlay network 200. Alternatively, the AF or NF of the overlay network 300 may obtain the location information of the terminal directly from the terminal through the application layer.

Alternatively, the AF or NF of the overlay network 300 may obtain the location information of the terminal using a terminal location-related service (e.g., Nnef_Location service) that may be provided by the NEF of the underlay network 200. In an embodiment, the AF or NF of the overlay network 300 may request the location information of the terminal by invoking the Nnef_Location_LocationUpdateNotify service operation for the NEF of the underlay network 200. When the AF or NF of the overlay network 300 requests the Nnef_Location service, the AF or NF of the overlay network 300 may input the identification of the AF (Identity of the AF), the UE identifier (e.g., GPSI), the event that caused the location estimation (e.g., 5GC-MO-LR), a location estimate, an age of location estimate, an accuracy indication, an LCS (location service) QoS class for the Nnef_Location_LocationUpdateNotify service operation.

In an embodiment, the AF or NF of the overlay network 300 may obtain the location information of the terminal for subscription of the QoS analytics information from an existing function entity (functionality). The existing function entity may include a Gateway Mobile Location Center (GMLC) or a Location Management Function (LMF) of the 5G system. Alternatively, the AF or NF of the overlay network 300 may obtain the location information of the terminal by the agreement between the overlay network 300 and the underlay network 200 or by a specific implementation.

In an embodiment, the AF or NF of the overlay network 300 may request the QoS related information from the NEF of the underlay network 200 by invoking Nnef_AnalyticsExposure_Subscribe/Unsubscribe service operation. Alternatively, the AF or NF of the overlay network 300 may request the QoS related information by transmitting a message for requesting QoS information related to the session of the AF (e.g., Nnef_AFsessionWithQoS message) to the NEF of the underlay network 200.

Upon receiving the request for the QoS related information from the AF or NF of the overlay network 300, the NEF of the underlay network 200 may subscribe to the QoS related information generated by the NF of the underlay network 200 by invoking a specific service operation and receive a notification of the QoS related information from the NF of the underlay network (S170).

In an embodiment, the NEF of the underlay network 200 may invoke the Nnwdaf_AnalyticsSubscription_Subscribe service operation for the NWDAF and receive the QoS sustainability from the NWDAF as the QoS related information. Below, the transfer procedure of the QoS sustainabilities information is illustrated through FIG. 4.

In an embodiment, the NEF of the underlay network 200 may receive QoS monitoring information from the SMF or the UPF of the underlay network 200 as the QoS related information. The NEF of the underlay network 200 may use Nsmf_EventExposure service and Nupf_EventExposure service to receive the QoS monitoring information from the SMF and the UPF.

Figure 4:
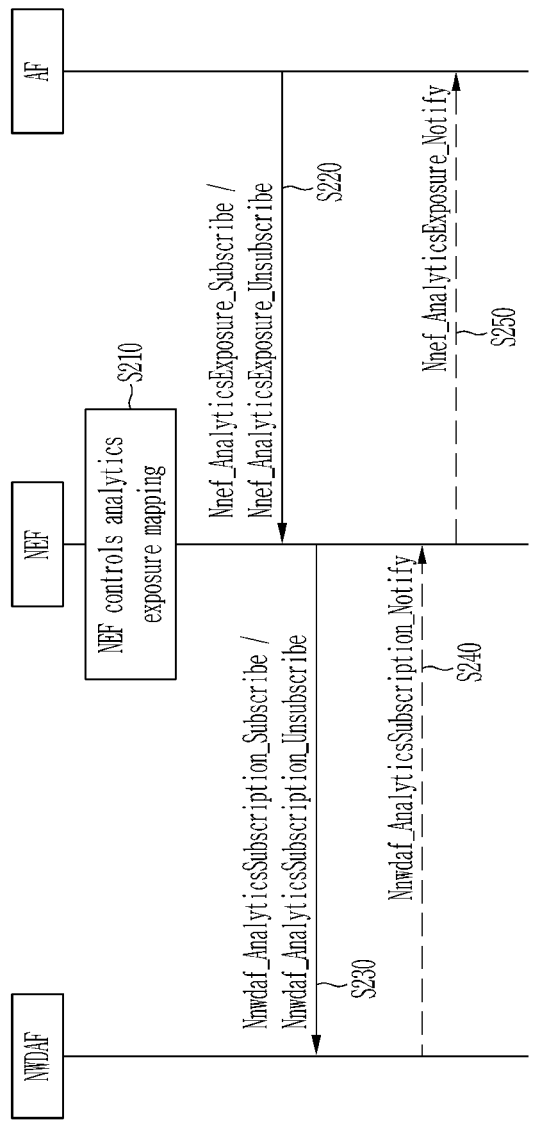
FIG. 4 is a flowchart illustrating a procedure in which an AF of the overlay network subscribes to the QoS sustainabilities to the underlay network according to an embodiment.

FIG. 4 is a flowchart illustrating a procedure in which an AF of the overlay network subscribes to the QoS sustainability analytics to the underlay network according to an embodiment.

Referring to FIG. 4, the NEF may control analytics exposure mapping (S210). In an embodiment, the NEF may control the analytics exposure mapping between an AF identifier with an authorized analytics ID and associated inbound restrictions (i.e., applied to AF subscribing to the analytics ID) and/or outbound restrictions (applied to a notification of the analytics ID to the AF).

In an embodiment, the AF may be configured to subscribe to analytics information, authorized analytics ID(s), and authorized inbound restrictions (i.e., parameter and/or parameter values) for subscribing to each analytics ID by an appropriate NEF.

The AF may subscribe to the analytics information via the NEF by invoking Nnef_AnalyticsExposure_Subscribe service operation. Alternatively, the AF may cancel the subscription of the analytics information via the NEF by invoking Nnef_AnalyticsExposure_Unsubscribe service operation (S220). In order to modify an existing analytics subscription, the AF may input an identifier to be modified (Subscription Correlation ID) when invoking the Nnef_AnalyticsExposure_Subscribe. The subscription to the analytics by the AF may be authorized by the NEF.

The AF may input the location information of the terminal and the QoS requirements when invoking the Nnef_AnalyticsExposure_Subscribe service operation.

Based on the request from the AF, the NEF may subscribe to the analytics information by invoking the Nnwdaf_AnalyticsSubscription_Subscribe service operation. Alternatively, based on the request of the AF, the NEF may cancel the subscription of the analytics information by invoking the Nnwdaf_AnalyticsSubscription_Unsubscribe service operation (S230). In an embodiment, Steps S220 and S230 of FIG. 4 may correspond to step S140 shown in FIG. 3.

When parameters and/or parameter values in the request of the AF complies with the inbound restrictions in the analytics exposure mapping, the NEF may transfer the analytics ID and parameters and/or parameters values in the request of the AF when invoking the Nnwdaf_AnalyticsSubscription_Subscribe service operation to the NWDAF.

When the request of the AF does not comply with the restrictions in the analytics exposure mapping, the NEF may apply restrictions to the subscription request to the NWDAF based on the operator configuration. For example, the restrictions may include a restriction on the parameter or the parameter value of the Nnwdaf_AnalyticsSubscription_Subscribe service operation. Alternatively, the NEF may apply parameter mapping. The parameter mapping may include, for example, mapping geographic coordinates to TA(s)/cell ID(s).

In an embodiment, the NEF may record the analytics request from the AF and the related information (association) of the analytics request sent to the NWDAF. In addition, the NEF may select an NWDAF that can support the analytics information requested by the AF using an NWDAF discovery procedure.

If the AF request is for modification of an existing analytics subscription, the NEF may invoke the Nnwdaf_AnalyticsSubscription_Subscribe service operation to modify the analytics subscription identified by the identifier (subscription correlation ID) associated with the AF.

When the NEF subscribes to the analytics information, the NWDAF may notify the NEF of the analytics information by invoking Nnwdaf_AnalyticsSubscription_Notify service operation (S240). When the NEF receives a notification from the NWDAF, the NEF may notify the AF of the analytics information by invoking the Nnef_AnalyticsExposure_Notify service operation (S250).

As described above, the end-to-end QoS between the non-public network and the public network may be guaranteed by appropriately obtaining prediction information that may be used when the AF of the overlay network determines whether the QoS requirements for the service to be provided to the terminal can be guaranteed.

Figure 5:
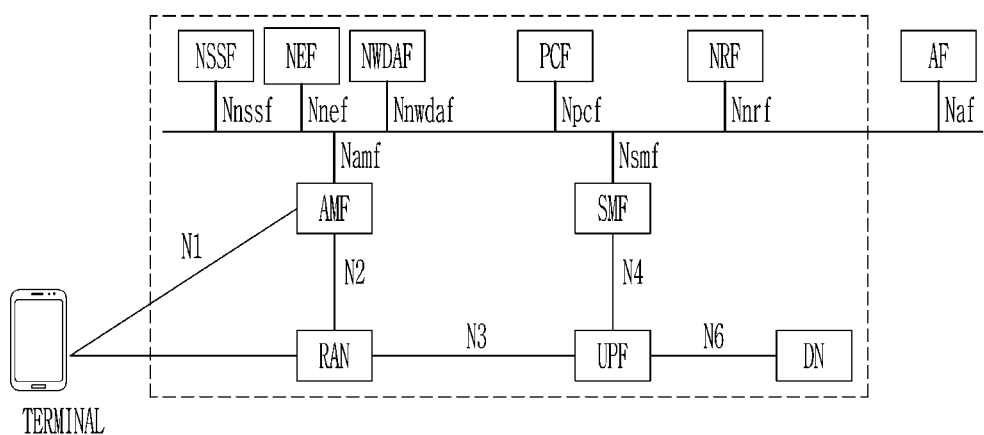
FIG. 5 is a schematic diagram illustrating the topology of a mobile communication system according to an embodiment.

FIG. 5 is a schematic diagram illustrating the topology of a mobile communication system according to an embodiment.

Referring to FIG. 5, a core network of a wireless communication system according to an embodiment includes a plurality of NFs and may connect the data network (DN) and the UE.

An (radio) access network ((R)AN) may represent a base station providing 3GPP access and/or a base station or AP (access point) providing non-3GPP access such as Wi-Fi.

The (R)AN may be connected to an access and mobility management function (AMF) through an N2 interface and may be connected to a user plane function (UPF) through an N3 interface.

The AMF may be responsible for a mobility management function for the UE. The AMF may provide an access and mobility management function to the access technology independently, that is, to a unit of a terminal or the UE. Therefore, each terminal may be basically connected to one AMF.

A session management function (SMF) may perform a function for managing a session up to the UE. When multiple sessions are maintained for the terminal, different SMFs may be assigned for each session.

A policy control function (PCF) may determine policies such as session management and mobility management based on packet flow information received from an application function (AF) to guarantee QoS (Quality of Service). The policy determined by the PCF may be transmitted to the AMFs, the SMFs, and the like, and then, functions such as the mobility management, the session management, the QoS management may be performed in each NF.

The DN may transfer a protocol data unit (PDU) to be transmitted to the terminal to the UPF or may receive a PDU transmitted from the terminal through the UPF. The UPF and the DN may be connected through an N6 interface.

The UPF may be configured using control signal information generated by the SMF and the UPF may report its status to the SMF through an N4 interface.

The terminal and the AMF may be connected through an N1 interface.

The authentication server function (AUSF) may store data for authentication of the terminal.

By collecting and analyzing various network data, the NWDAF may help optimization of operations of the network functions in the core network, such as the AMF, the SMF, and the PCF. The NWDAF may provide various analysis information and/or analytics required for optimizing the operations of the network functions by analyzing data, events, and state information from various network functions in the core network. Therefore, each network function may optimize its operation by utilizing various analysis information and/or analytics provided by the NWDAF.

A network repository function (NRF) is an entity in the core network that may store information such as a profile of a network function (capacity, load, and state of the network function) of network function. The information stored in the NRF may be provided by invoking service operations such as NFDiscovery_Request and NFManagement_NFStatusNotify.

A network exposure function (NEF) is an entity that may safely expose services and capabilities provided by the 3GPP network functions to a third-party server outside the 3GPP network.

Figure 6:
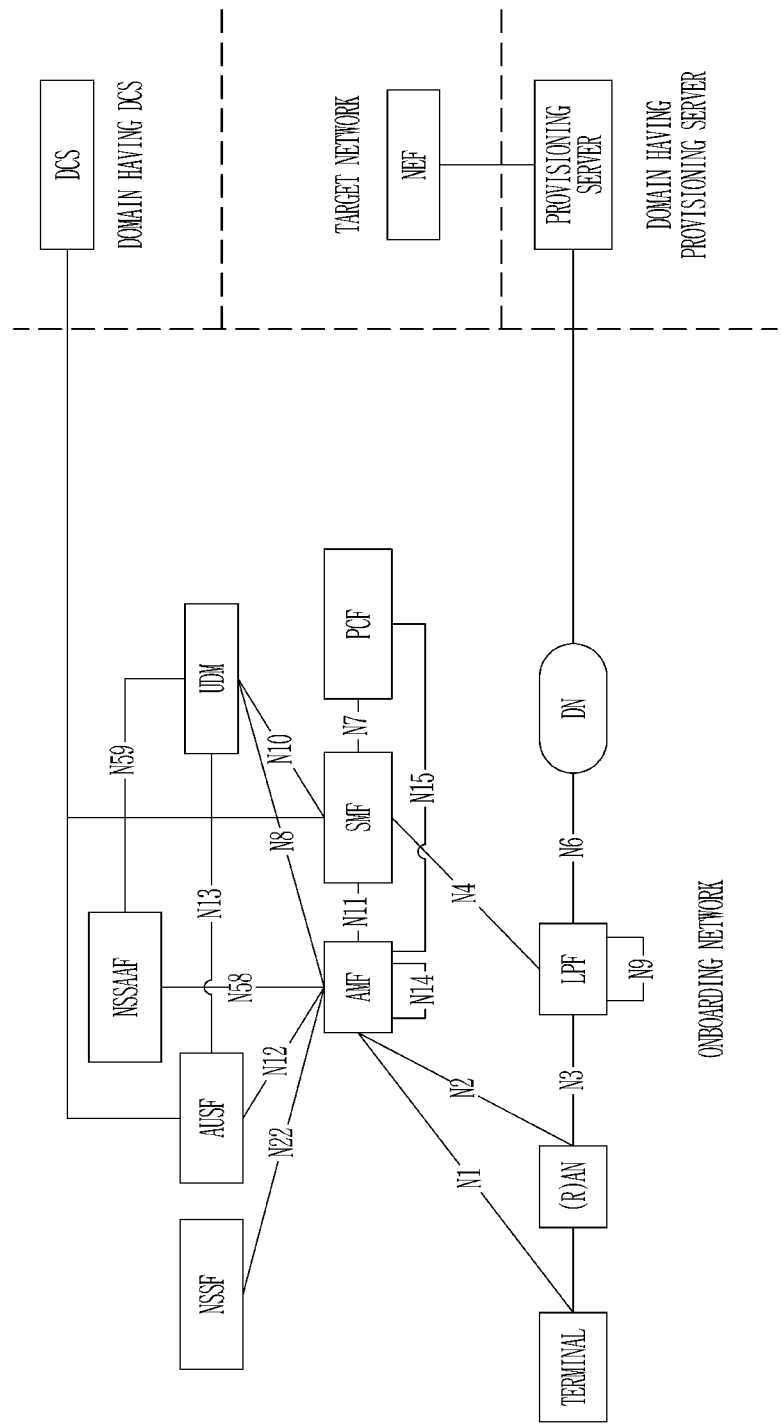
FIG. 6 is a diagram illustrating an architecture of an onboarding network and a target network according to an embodiment.

FIG. 6 is a diagram illustrating an architecture of an onboarding network and a target network according to an embodiment.

Referring to FIG. 6, a terminal may select an onboarding network for a remote provisioning service. In an embodiment, the onboarding network is a network capable of the 3GPP access and may be the public network or the NPN. The NPN may include the SNPN, the PNI-NPN, and the like.

The terminal may select the onboarding network based on broadcasting information from the onboarding network. In an embodiment, the broadcasting information of the onboarding network may include whether to support onboarding registration. Then, the terminal may complete registration with the selected onboarding network, receive information required to access the target network through the onboarding network, and access a provisioning server (PVS) based on received information. In an embodiment, the target network may be a network that can provide a specific service to the terminal and may be the public network or the non-public network. The NPN may include the SNPN, the PNI-NPN, and the like. In an embodiment, the PVS may store necessary information for the terminal to access the target network.

When network selection parameters for the selection of the onboarding network is not configured on the terminal, the terminal may select the onboarding network in a manual manner. In the registration phase, when the terminal requests the registration to the onboarding network, the onboarding network may authenticate the terminal by using the default UE credentials to determine whether the terminal is authorized to access the provisioning server through a PDU session. The terminal may be a terminal that does not have typical 3GPP credentials. In an embodiment, the default UE credentials may be information configured to make the UE to be uniquely identified and verifiably secure to perform UE onboarding and may be stored in the terminal and/or the default credentials server (DCS) before the terminal performs the onboarding procedure. The onboarding network needs to connect to a device or server in an external domain such as the DCS to confirm the default UE credentials of the terminal.

When the terminal successfully accesses the provisioning server via the onboarding network, subscription credentials and other necessary information may be provisioned to the terminal by the provisioning server for access to the target network. When the subscription credentials and necessary information are completely provisioned to the terminal, the terminal may deregister from the onboarding network and attempt to connect to the target network using the provisioned information.

In the present description, various network architectures may be possible. In an embodiment, both the DCS and the PVS may be located in the onboarding network or located in the target network. Alternatively, the DCS and the PVS may be located in different networks, respectively. Referring to FIG. 6, In an embodiment, the DCS is located in a first domain, PVS is located in a second domain, and the first domain and the second domain are shown as domains different from the onboarding network.

In an embodiment, when the onboarding service is provided to the terminal, the AMF in the onboarding network may select the SMF to be used for the onboarding service by using the SMF discovery and selection function (discovery and selection functionality). Onboarding configuration data of the AMF may include a single-network slice selection assistance information (S-NSSAI) and data network name (DNN) information to select the SMF to be used for the onboarding service.

When the UPF is selected for the onboarding service, UPF selection function for general service may be applied in consideration of DNN used for the onboarding. The SMF and/or the PCF may store the S-NSSAI and the DNN information used for the onboarding.

The onboarding configuration data available to the PCF and/or the SMF may include a provisioning server address (PVS address). The onboarding configuration data available to the PCF and/or the SMF may include a plurality of PVS addresses when a plurality of PVS exists. In an embodiment, the PVS address may be in the form of a PVS IP address or a PVS entire address domain name (Fully Qualified Domain Name, FQDN). In an embodiment, the PVS address may be configured by agreement between the operator of the onboarding network and a third party ($3^{rd}$ party). Based on the agreement, the PVS address may be pre-configured in the terminal. In an embodiment, the third party may be the owner of the DCS, the owner of the PVS, or the manufacturer. Alternatively, the PVS address may be pre-configured by information included in a request from the terminal.

In an embodiment, the PVS address may be changed by creation, update, or deletion of the PVS and the PVS may notify the DCS of the creation, update, or deletion of the PVS address. In an embodiment, the DCS may inform the onboarding network of the latest PVS address derived by an event such as the creation, update, or deletion of the PVS address and the onboarding network may inform the terminal attempting to access the PVS of the latest PVS address.

The PVS address may be transferred to the onboarding network by other servers or entities in the domain to which the DCS belongs. In an embodiment, the AUSF and unified data management (UDM) of the domain to which the DCS belongs may transfer the PVS address of the provisioning server to the AMF of the onboarding network. In this case, the PVS address may be transferred through an interface connecting the domain to which the DCS belongs and the onboarding network. Alternatively, an authentication, authorization, and charging (AAA) server of the domain to which the DCS belongs may transfer the PVS address of the provisioning server to the AUSF and/or AMF of the onboarding network. In this case, the PVS address may be transmitted through a AAA protocol between the domain to which the DCS belongs and the onboarding network.

When a terminal registered in the onboarding network successfully receives subscription credentials to access the target network through the remote provisioning, the terminal needs to deregister the onboarding network. The initial QoS parameter used for establishing the onboarding service may be configured in the SMF when dynamic policy and charging control (PCC) is not used. In an embodiment, the dynamic PCC may be used for a PDU session for the onboarding service. The QoS flow of the PDU session associated with the restricted DNN may be dedicated for the onboarding service.

Figure 7:
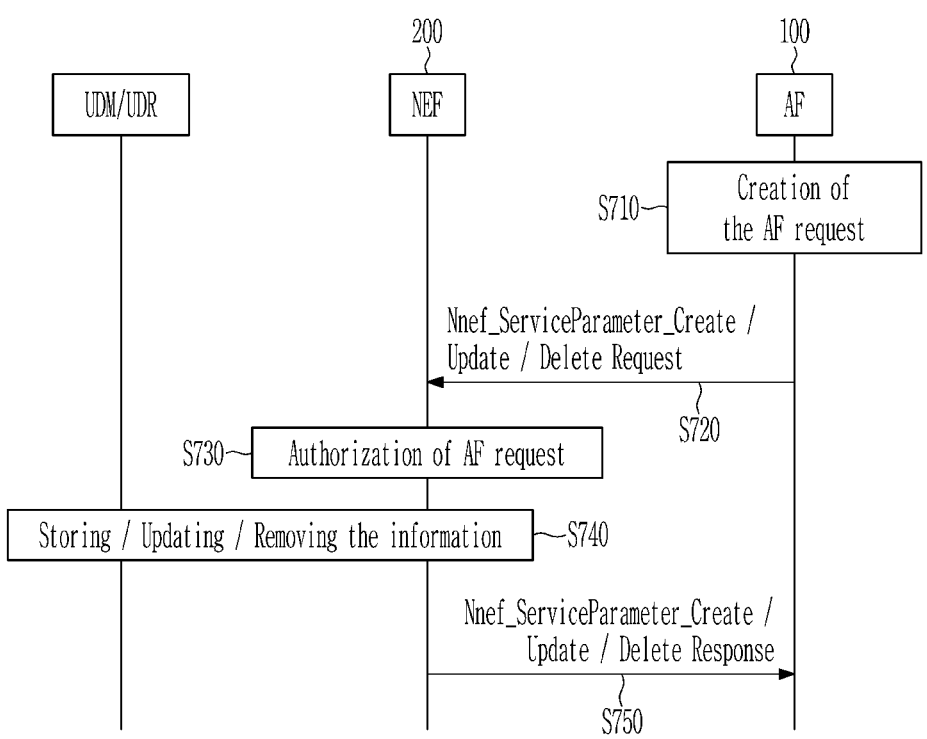
FIG. 7 is a flowchart illustrating a method for transferring a PVS address according to an embodiment.

FIG. 7 is a flowchart illustrating a method for transferring a PVS address according to an embodiment.

Referring to FIG. 7, an AF 100 of the external domain that may perform the DCS or PVS role may create a new request (e.g., AF request) for configuring the PVS address (S710). In an embodiment, the PVS address may be changed by the creation of the PVS, update of the PVS, deletion of the PVS, etc., and AF 100 may create the request for the onboarding network to configure the PVS address according to the creation, update, or deletion of the PVS.

Then, the AF 100 may invoke the NF service to the onboarding network to configure the PVS address (S720). In an embodiment, the AF 100 may invoke Nnef_ServiceParameter_Create service operation when the PVS is newly created. Alternatively, the AF 100 may invoke the Nnef_ServiceParameter_Update service operation to update the existing PVS address or invoke the Nnef_ServiceParameter_Delete service operation to delete the existing PVS address. When the AF 100 invokes the NF service operation for updating or deleting the PVS address, the AF 100 may input corresponding transaction reference ID provided to the AF 100 in the response message of the Nnef_ServiceParameter_Create service operation.

When the service operation is invoked by the AF 100, the NEF 200 may authorize the request of the AF 100 (S730). The NEF 200 may perform the following mapping to authorize the request of the AF 100.

The NEF 200 may map service identifier (e.g., AF-Service-Identifier) into a combination of the DNN information and the S-NSSAI determined by local configuration.

The NEF 200 may map the GPSI in the target terminal identifier (Target UE Identifier) into the SUPI according to information received from the UDM.

The NEF 200 may map an external group identifier in the target terminal identifier into an internal group identifier according to information received from the UDM.

When the Nnef_ServiceParameter_Create service operation is invoked, the NEF 200 may allocate a transaction reference ID to the Nnef_ServiceParameter_Create request.

Then, the NEF 200 may create a PVS address in unified data management (UDM)/unified data storage (UDR), or update the PVS address in the UDM/UDR, or delete the PVS address in the UDM/UDR (S740).

In an embodiment, the NEF 200 may store, in the UDR, the request (including the PVS address) of the AF 100 as "application data" together with allocated transaction reference ID. The application data may be a data subset that sets "service specific information". Alternatively, the NEF 200 may delete the request information of the AF 100 in the UDR.

Then, the NEF 200 may respond to the service operation invoked by the AF 100 (S750). In an embodiment, the previously allocated transaction reference ID may be included in the response message of the Nnef_ServiceParameter_Create service operation.

Then, the terminal may receive the PVS address from the onboarding network and may access the PVS using the received PVS address. In an embodiment, when the terminal requests PVS address information from the onboarding network, the onboarding network may forward the PVS address received from the AF 100 to the terminal. According to the flowchart of FIG. 7, the UDM of the onboarding network may receive the PVS address from the AF 100 and may provide the received PVS address to the SMF. Then, the SMF may provide the corresponding PVS address to the PCF. In an embodiment, the AF 100 (e.g., DCS) may provide the PVS address to the AMF of the onboarding network when the AF 100 performs an authentication procedure for the terminal connected to the onboarding network, and the AMF of the onboarding network may send the PVS address received from AF 100 to the SMF of the onboarding network. For example, the PVS address may be included in the Nsmf_PDUSession_CreateSMContext request message that the AMF of the onboarding network transmits to the SMF.

In an embodiment, the PVS address transmitted from the AF 100 may be transferred to the SMF via the AMF, and the terminal may receive the PVS address from the SMF in the response procedure of the PDU session establishment procedure. When the PVS address is created, updated, or deleted in the UDM/UDR of the onboarding network in step S740 of FIG. 7, the SMF of the onboarding network may receive the latest PVS address to which the state of creation, update, or deletion is applied from the UDM. In an embodiment, the SMF may receive information on the change (change according to the creation, update, or deletion) of the PVS address from the UDM/UDR through a request of Nudm_SDM_Subscribe and a notification of Nudm_SDM_Notification.

As described above, when a change occurs in the provisioning server address, the onboarding network may reflect the change in the provisioning server address and transfer the provisioning server address to the terminal requesting access to the provisioning server.

Figure 8:
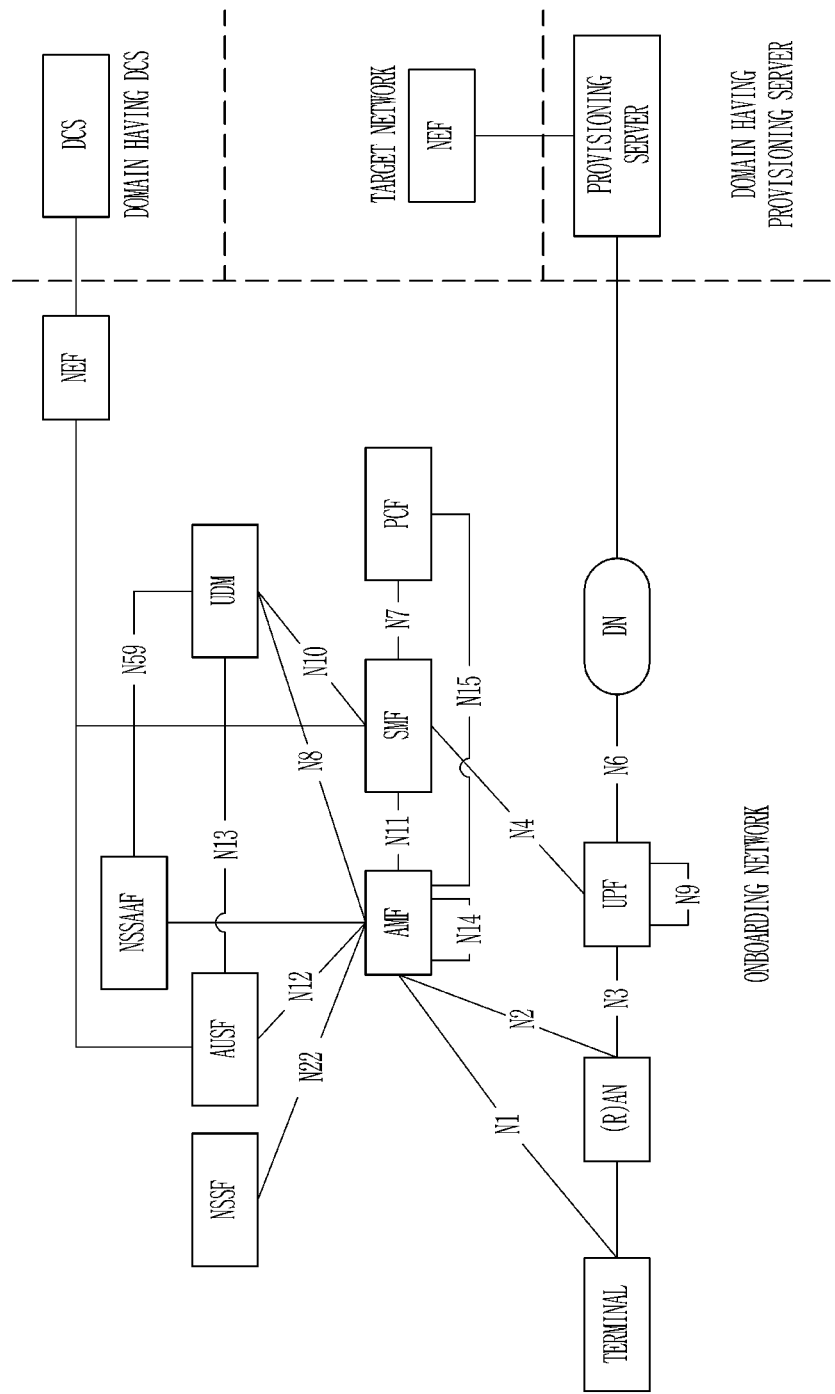
FIG. 8 is a diagram illustrating an architecture of an onboarding network and a target network according to an embodiment.
Figure 9:
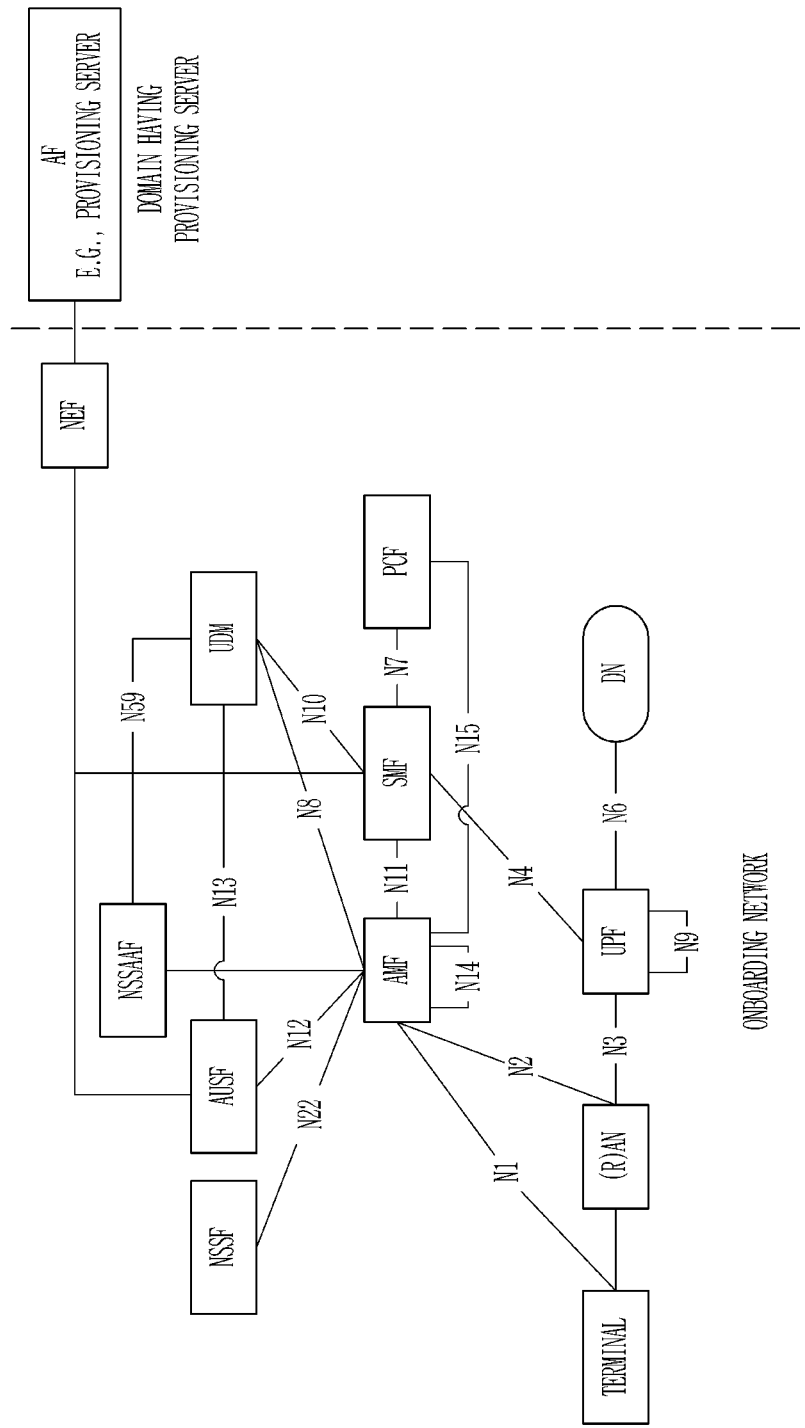
FIG. 9 is a diagram illustrating the onboarding network and a domain owning a provisioning server according to an embodiment.

FIG. 8 is a diagram illustrating an architecture of an onboarding network and a target network according to an embodiment and FIG. 9 is a diagram illustrating the onboarding network and a domain owning a provisioning server according to an embodiment.

Referring to FIG. 8, the terminal may select an onboarding network for a remote provisioning service. In an embodiment, the onboarding network is a network capable of the 3GPP access and may include the NPN, and the NPN may include the SNPN, the PNI-NPN, and so on.

The terminal may select the onboarding network based on broadcasting information of the onboarding network. In an embodiment, the broadcasting information of the onboarding network may include whether to support onboarding registration. After that, the terminal may complete registration with the selected onboarding network and access a provisioning server through the onboarding network to obtain information required for access to the target network. In an embodiment, the target network is a network that may provide a specific service to the terminal and may include the NPN, and the NPN may include the SNPN, the PNI-NPN, and so on. In an embodiment, the provisioning server may store necessary information for the terminal to access the target network.

When network selection parameters for selection of the onboarding network is not configured on the terminal, the terminal may select the onboarding network in a manual manner. In the registration phase, when the terminal requests the registration to the onboarding network, the onboarding network may authenticate the terminal by using the default UE credentials to determine whether the terminal is authorized to access the provisioning server through a PDU session. In an embodiment, the default UE credentials may be stored in a default credentials server (DCS), and the onboarding network need to connect a server for the default UE credentials in the external domain such as the DCS to confirm the default UE credentials of the terminal.

When the terminal successfully accesses the provisioning server via the onboarding network, the subscription credentials and other necessary information required for the access to the target network may be provisioned to the terminal by the provisioning server. When the subscription credentials and necessary information are completely provisioned to the terminal, the terminal may deregister from the onboarding network and attempt to connect to the target network using the provisioned information.

Referring to FIG. 9, the AF outside the onboarding network may be located in a trusted domain or an untrusted domain. In an embodiment, the AF in the external domain may perform a function or role of the provisioning server or the DCS.

In FIG. 8 and FIG. 9, a dotted line between the NEF in the onboarding network and the AF in the external domain may be used to indicate that the provisioning server may locate in a trusted domain or the untrusted domain.

When the AF is located in the untrusted domain, the AF may communicate with the onboarding network via the NEF, and when the AF is located in the trusted domain, the AF may communicate directly with the NF in the onboarding network without going through the NEF.

In an embodiment, the internal network function of the onboarding network may need to communicate with a server and/or an AF (e.g., the DCS) for authentication/authorization of the external domain to confirm whether the terminal is authorized to access the provisioning server.

For example, in a control plane remote provisioning, the AMF and/or the AUSF in the onboarding network may directly receive, from the AF in the trusted domain, credentials information (e.g., subscription credentials) and/or configuration information (e.g., supported target NPN list and security information corresponding to each target NPN in the list). However, the AMF and/or the AUSF in the onboarding network may indirectly receive the credentials information and/or the configuration information from the AF in the untrusted domain.

In the following, a method for communicating with a device located in a external domain of the onboarding network by the network function of the onboarding network is described.

Figure 10:
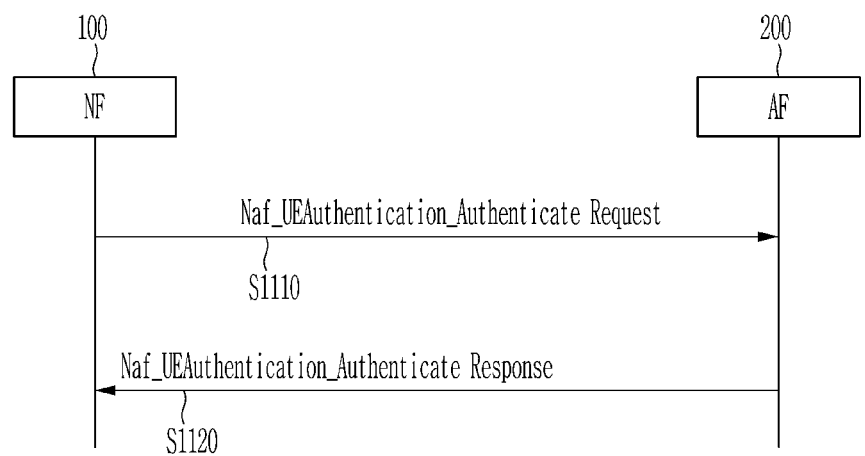
FIG. 10 is a flowchart illustrating a method in which the network function of the onboarding network communicates with the AF in the trusted domain according to an embodiment.

FIG. 10 is a flowchart illustrating a method in which the network function of the onboarding network communicates with the AF in the trusted domain according to an embodiment.

In an embodiment, the NF 100 of the onboarding network may use the NF service provided by the AF 200 to receive authentication-related information for the terminal from the AF 200 in the trusted domain outside the onboarding network. In an embodiment, the NF service for receiving the authentication-related information of the terminal from the AF 200 in the trusted domain by the NF 100 may be a Naf_UEAuthentication service.

The procedures of FIG. 10 may be a part of the procedures for the terminal to register with the onboarding network. In FIG. 10, the NF 100 may be the AMF or the AUSF in the onboarding network and AF 200 may be the DCS or the provisioning server located in the trusted external domain.

The authentication-related information for the terminal that the NF 100 requests to the AF 200 in the trusted domain may include credentials data (e.g., subscription credentials) and/or configuration data (supported target NPN list and security information corresponding to each target NPN in the target NPN list). The Naf_UEAuthentication service may be configured as shown in Table 1 below.

TABLE 1

| service name | service operation | operation semantics | Example consumer |
| --- | --- | --- | --- |
| Naf_UEAuthentication | Authenticate | Request/Response | AMF, AUSF |

Referring to FIG. 10, the NF 100 such as the AMF or the AUSF may transmit a Naf_UEAuthentication_Authenticate Request to the AF 200 to receive the authentication-related information for terminal from the AF 200 in the trusted domain (S1110). In an embodiment, the NF 100 may input an onboarding subscription permanent identifier (SUPI) or an onboarding subscription concealed identifier (SUCI) when invoking the Naf_UEAuthentication_Authenticate service operation. In an embodiment, the NF 100 may additionally input the default UE credentials when invoking the Naf_UEAuthentication_Authenticate service operation.

The AF 200 may transmit the authentication-related information for the terminal to the NF 100 by sending a Naf_UEAuthentication_Authenticate Response to the NF 100 (S1120). In an embodiment, the AF 200 may transmit subscription credentials, a list of supported target NPNs, and security information corresponding to the NF 100 as an output of the Naf_UEAuthentication_Authenticate service operation.

Figure 11:
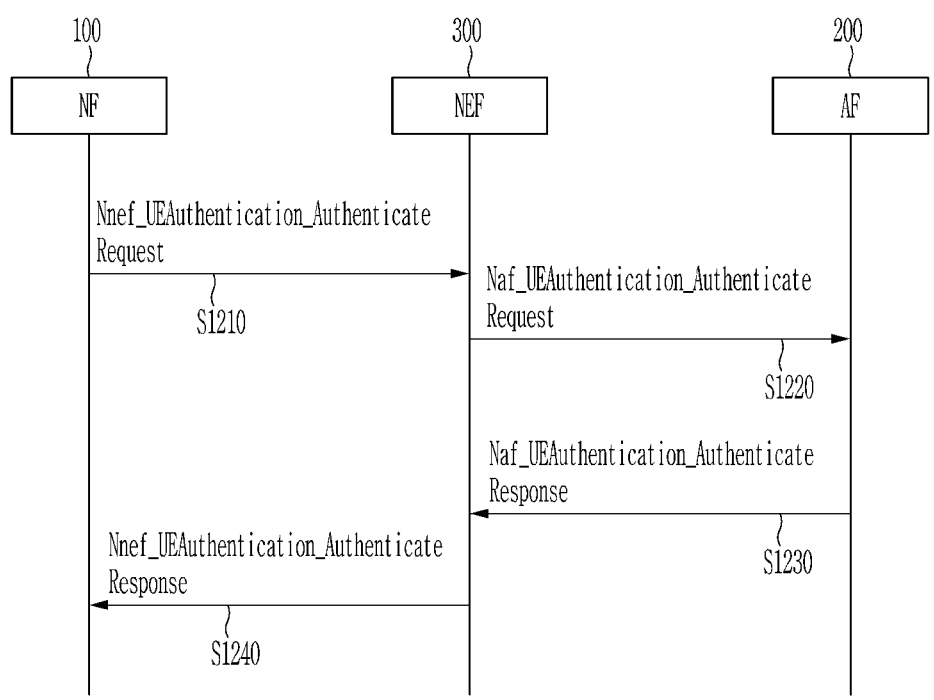
FIG. 11 is a flowchart illustrating a method in which the network function of the onboarding network communicates with the AF in the untrusted domain according to an embodiment.

FIG. 11 is a flowchart illustrating a method in which the network function of the onboarding network communicates with the AF in the untrusted domain according to an embodiment.

In an embodiment, the NF 100 of the onboarding network may receive the authentication-related information for the terminal from the AF 200 in the untrusted domain outside of the onboarding network via the NEF 300 of the onboarding network. That is, the NF 100 may request the authentication-related information to the NEF 300 using the NF service provided by the NEF 300, and the NEF 300 that receives the request of the NF 100 may transfer the request for the authentication-related information to the AF 200 by using the NF service provided by the AF 200. Then, the authentication-related information for the terminal may be transferred to the NF 100 from the AF 200 in the untrusted domain through the NEF 300.

In an embodiment, the NF service used when the the NF 100 requests the authentication-related information to the NEF 300 and receives a corresponding response may be the Nnef_UEAuthentication service. In addition, the NF service used when the NEF 300 transfers a request for the authentication-related information for the AF 200 and transfers a response to the request for the authentication-related information received from the AF 200 to the NF 100 may be a Naf_UEAuthentication service.

The procedures in FIG. 11 may be a part of the procedures for the terminal to register with the onboarding network. In FIG. 11, the NF 100 may be the AMF or the AUSF in the onboarding network, and the AF 200 may be the DCS or the provisioning server located in the untrusted external domain.

The authentication-related information for the terminal that the NF 100 requests to the AF 200 in the untrusted domain may include credentials data (e.g., subscription credentials) and/or configuration data (supported target NPN list and security information corresponding to each target NPN in the target NPN list). The Nnef_UEAuthentication service may be configured as shown in Table 2 below.

TABLE 2

| service name | service operation | operation semantics | Example consumer |
| --- | --- | --- | --- |
| Nnef_UEAuthentication | Authenticate | Request/Response | AMF, AUSF |

The Naf_UEAuthentication service used by the NEF 300 to transfer a request of the NF 100 to the AF 200 in the untrusted domain may be configured as shown in Table 3 below.

TABLE 3

| service name | service operation | operation semantics | Example consumer |
| --- | --- | --- | --- |
| Naf_UEAuthentication | Authenticate | Request/Response | NEF |

The Naf_UEAuthentication service is generally the same as in Table 1 above, but the example consumer in Table 1 may be the NEF in the Naf_UEAuthentication service of the embodiment of FIG. 11.

Referring to FIG. 11, the NF 100 such as the AMF or the AUSF may transmit Nnef_UEAuthentication_Authenticate Request to the NEF 300 to receive the authentication-related information for the terminal from the AF 200 in the untrusted domain (S1210). In an embodiment, the NF 100 may input onboarding SUPI or onboarding SUCI when invoking the Nnef_UEAuthentication_Authenticate service operation. In an embodiment, the NF 100 may additionally input the default UE credentials when invoking the Nnef_UEAuthentication_Authenticate service operation.

Upon receiving the Nnef_UEAuthentication_Authenticate Request from the NF 100, the NEF 100 may transmit the Naf_UEAuthentication_Authenticate Request to the AF 200 in the untrusted domain (S1220). In an embodiment, the onboarding SUPI or the onboarding SUCI received from NF 100 may be an input for the Naf_UEAuthentication_Authenticate Request service operation. Also, the default UE credentials may be an input for the Naf_UEAuthentication_Authenticate service operation.

The AF 200 may transfer the authentication-related information for the terminal by sending a Naf_UEAuthentication_Authenticate Response to the NEF 300 (S1230). In an embodiment, the subscription credentials, the list of supported target NPNs, and the security information corresponding thereto may be an output of a Naf_UEAuthentication_Authenticate service operation invoked by the AF 200.

The NEF 300 may transmit an Nnef_UEAuthentication_Authenticate Response to the NF 100 (S1240). In an embodiment, the subscription credentials, the supported target NPN list, and the security information transferred from the AF 200 may be an output of the Nnef_UEAuthentication_Authenticate service operation invoked by the NEF 300.

As described above, the NF according to an embodiment can receive the credentials information and configuration information of the terminal from the external domain by using a newly configured NF service, so that the remote provisioning service may be better supported through the 5G non-public network.

Figure 12:
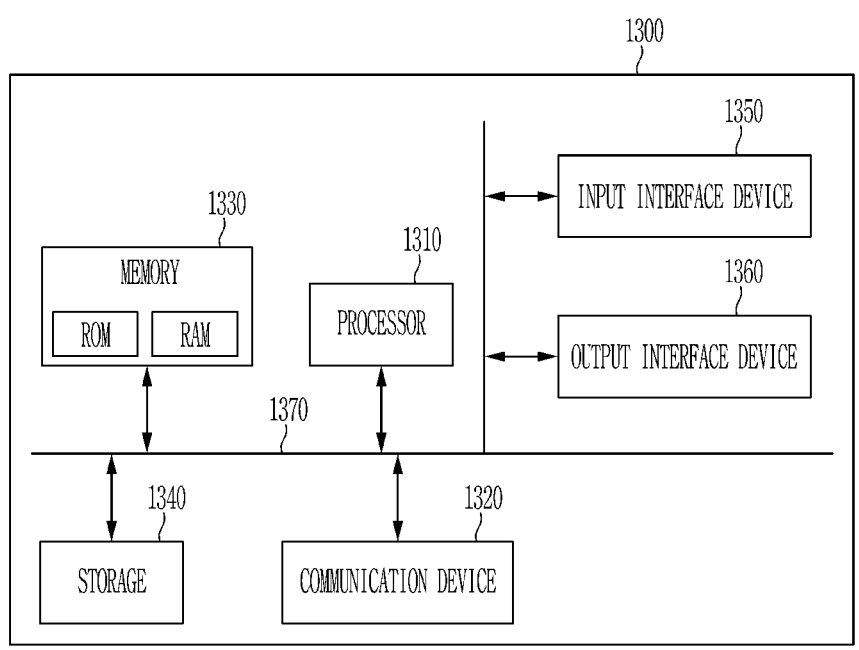
FIG. 12 is a block diagram illustrating a function entity of a network according to an embodiment.

FIG. 12 is a block diagram illustrating a function device according to an embodiment.

The function device according to an embodiment may be one of NFs or Afs in a wireless communication system and may be implemented as a computer system, for example, a computer-readable medium. Referring to FIG. 12, the computer system 1300 may include at least one of a processor 1310, a memory 1330, an input interface device 1350, an output interface device 1360, and a storage device 1340 communicating through a bus 1370. The computer system 1300 may also include a communication device 1320 coupled to the network. The processor 1310 may be a central processing unit (CPU) or a semiconductor device that executes instructions stored in the memory 1330 or the storage device 1340. The memory 1330 and the storage device 1340 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 1320 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An application function (AF) in a first network, the AF comprising a processor, a memory, and a communication device, wherein the processor executes a program stored in the memory to perform:
   requesting quality of service (QOS) related information to a network exposure function (NEF) of a second network different from the first network in which the AF is located by invoking a service operation for a network exposure service to the NEF, wherein the QoS related information includes QoS sustainabilities and is used to guarantee the QoS of a service to be provided to a terminal; and
   receiving the QoS related information from the NEF of the second network,
   wherein the requesting comprises inputting location information of the terminal and QoS requirements required for network-initiated QoS modification of the second network, wherein the QoS requirements include a 5G QoS Identifier (5QI) and QoS characteristics,
   wherein the QoS related information is determined, based on a service level agreement (SLA) between the first network and the second network, using the 5QI and the QoS characteristics,
   wherein the first network comprises a network that provides a service required by the terminal and the second network comprises a network to which the terminal is directly connected,
   wherein the terminal establishes protocol data unit (PDU) sessions with the first network based on non-3GPP access and PDU sessions with the second network based on 3GPP access,
   wherein one of the first network and the second network comprises a public land mobile network (PLMN), and another comprises a stand-alone non-public network (SNPN),
   wherein when the processor performs the inputting location information of the terminal and QoS requirements when invoking the service operation, the processor performs obtaining the location information of the terminal by invoking a service operation for a location-related service for the terminal to the NEF of the second network.

2. The AF of claim 1,
wherein the QoS sustainabilities are provided by a network data analytics function (NWDAF) in the second network.

3. The AF of claim 1,
wherein when the processor performs the inputting location information of the terminal and QoS requirements when invoking the service operation, the processor performs
obtaining the location information of the terminal from the second network based on the SLA.

4. The AF of claim 1,
wherein when the processor performs the inputting location information of the terminal and QoS requirements when invoking the service operation, the processor performs
obtaining the location information of the terminal from a gateway mobile location center (GMLC) or a location management function (LMF) of the second network.

5. The AF of claim 1,
wherein when the processor performs the inputting location information of the terminal and QoS requirements when invoking the service operation, the processor performs
obtaining the location information of the terminal from the terminal through an application layer.

6. The AF of claim 1,
wherein when the processor performs the inputting location information of the terminal and QoS requirements when invoking the service operation, the processor performs
inputting a QoS characteristics for a QoS to be required by the AF as the QoS requirements subject to a service level agreement (SLA) between the first network and the second network.

7. The AF of claim 1,
wherein when the processor performs the requesting of the QoS related information, the processor performs
requesting the QoS related information by sending a message requesting QoS information related to a session of the AF to the NEF,
wherein the QoS related information includes QoS monitoring information received from a session management function (SMF) or user plane function (UPF) in the second network.

8. The AF of claim 1,
wherein the first network is connected to the terminal with non-3GPP access, the second network is connected to the terminal with 3GPP access, and the AF provides the service to the terminal via the second network.

9. A method for providing a service to a terminal by an application function (AF) in a first network via a second network, the method comprising:
requesting quality of service (QOS) related information to a network exposure function (NEF) of the second network by invoking a service operation for a network exposure service to the NEF, wherein the QoS related information includes QoS sustainabilities and is used to guarantee the QoS of the service; and
receiving the QoS related information from the NEF of the second network,
wherein the invoking comprises inputting location information of the terminal and QoS requirements required for network-initiated QoS modification of the second network, wherein the QoS requirements include a 5G QoS Identifier (5QI) and QoS characteristics,
wherein the QoS related information is determined, based on a service level agreement (SLA) between the first network and the second network, using the 5QI and the QoS characteristics,
wherein the first network is connected to the terminal with logical non-3GPP access and the second network is connected to the terminal with 3GPP access,
wherein the first network comprises a network that provides a service required by the terminal and the second network comprises a network to which the terminal is directly connected,
wherein the terminal establishes PDU sessions with the first network based on non-3GPP access and PDU sessions with the second network based on 3GPP access,
wherein one of the first network and the second network comprises a PLMN, and another comprises a SNPN, and
wherein
the inputting location information of the terminal and QoS requirements when invoking the service operation comprises obtaining the location information of the terminal by invoking a service operation for a location-related service for the terminal to the NEF of the second network.

10. The method of claim 9,
wherein the QoS sustainabilities are provided by a network data analytics function (NWDAF) in the second network.

11. The method of claim 9, wherein
the inputting location information of the terminal and QoS requirements when invoking the service operation comprises
obtaining the location information of the terminal from the second network based on the SLA.

12. The method of claim 9, wherein
the inputting location information of the terminal and QoS requirements when invoking the service operation comprises
obtaining the location information of the terminal from a gateway mobile location center (GMLC) or a location management function (LMF) of the first network.

13. The AF of claim 1,
wherein the first network comprises an overlay network, and
wherein the second network comprises an underlay network.

* * * * *